May 1, 1956     T. L. BINSWANGER     2,743,819
PROCESS OF LEACHING ORES AND A CENTRIFUGE FOR USE THEREWITH
Filed March 30, 1951     3 Sheets-Sheet 1

INVENTOR
T.L. BINSWANGER
BY *Farney & O'Connell*
ATTORNEYS

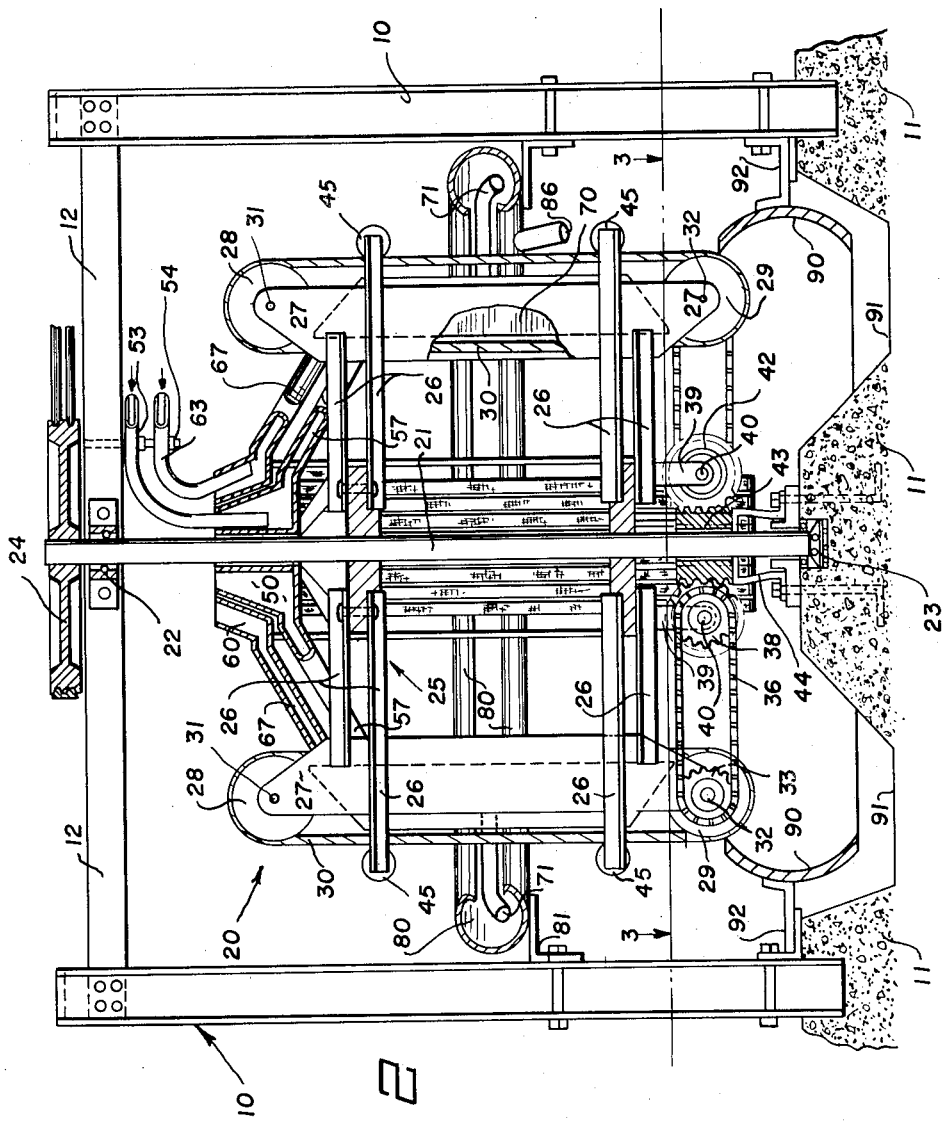

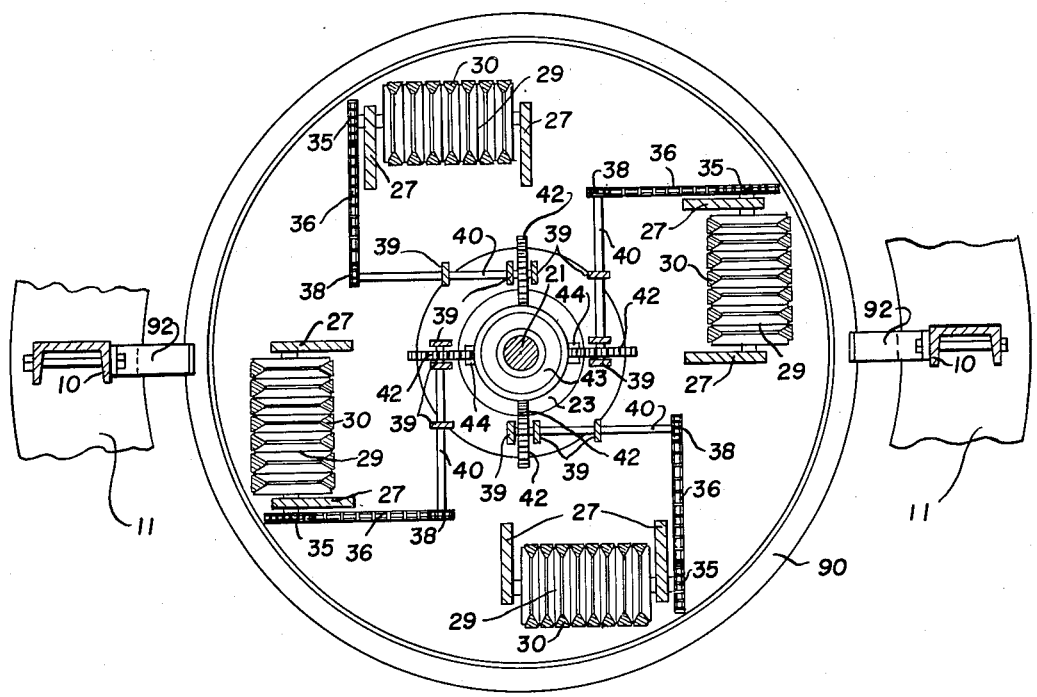

United States Patent Office 2,743,819
Patented May 1, 1956

2,743,819

PROCESS OF LEACHING ORES AND A CENTRIFUGE FOR USE THEREWITH

Tolstoy L. Binswanger, Carlsbad, N. Mex.

Application March 30, 1951, Serial No. 218,468

4 Claims. (Cl. 210—68)

This invention relates ot the leaching of ores in order to extract therefrom their valuable minerals, and also to a centrifuge for use in the leaching process.

At the present time the method or process now generally employed for extracting valuable mineral from ores comprises first the step of breaking or grinding the ore to a maximum size consistent with the desired degree of recovery of the valuable mineral from the ores. Obviously, in grinding ore to a predetermined maximum size, the pulp will contain certain proportions of grains of ore ranging in size from the maximum size to that of microscopic proportions. All of these grains must be removed from the solution if a mineral product of high purity is to be obtained.

Following the above-mentioned breaking up or grinding step, the ground ore together with a dissolving solution is placed in a dissolving vat where the solution takes up the desired mineral. Here it may be stated that in this type of process of mineral recovery the solution is the valuable substance to be saved and the undissolved solid substance is now considered waste to be discarded.

From the dissolving tank the liquor and solid substance are caused to flow into a settling tank where the large grains settle to the bottom of such tank and the liquor which still holds in suspension the fine and finest grains of solids, overflow into another tank wherein contact is made with chemical reagents that cause the fine grained solids to flocculate. The next step is then to draw off the clear liquor at the top of this last-mentioned tank for further processing while the aggregate settles to the lower portion of the tank from whence it is conducted to still another tank where the fine grained solids are further concentrated, thereby extracting to the greatest extent possible, the remaining liquor. However, in the very best practice these solids will not settle out to a satisfactory degree, and consequently at the conclusion of this step in the proces there is left what is known in the art as "slime." This slime still contains a great deal of value-bearing solution even though it be subjected to flocculation and further treatment especially designed to thicken it. As a consequence, this slime represents a considerable loss in valuable mineral. Therefore, it is highly desirable and economical to extract from this "slime," and to the greatest degree possible, this value-bearing solution.

It is the primary object of this invention to provide for the recovering of the loss of the valuable mineral which is now sustained on account of the inability of the aforementioned ore leaching method to etxract the value-bearing solution from the slime remaining after the above-mentioned process has been completed. To that end my invention contemplates the utilization of the coarse waste material, above referred to in connection with the dissolving step above-mentioned, as a filter for the slime remaining following completion of the aforementioned or leaching process, since I have found in actual practice that in so utilizing this coarse waste material the valuable mineral in the slime is recovered to a very great extent, if not in toto.

A further object of the present invention is to provide a practicable centrifuge for utilizing the coarse waste material as a filter for the slime.

It is still another object of the invention to provide a centrifuge which, while primarily designed for the purpose above-stated, may also be used with equal advantage for the separation of any solids from liquids.

This application is a continuation-in-part of my copending application, Serial No. 14,494, filed March 12, 1948, now abandoned, entitled "Continuous Centrifugal Separator With Self-Renewing Filter Medium" and embodies certain new and useful embodiments over the type of centrifuge therein disclosed.

Other objects of the invention will be apparent from the following description of the preferred form of the invention, taken in connection with the accompanying drawings; wherein:

Figure 2 is a vertical sectional view taken substantially on the line 2—2 of Figure 1, looking in the direction of the arrows;

Figure 3 is a horizontal sectional view taken substantially on the line 3—3 of Figure 2, and looking downwardly; and Figure 4 is a fragmentary elevational view of a filter belt assembly forming a salient feature of this invention.

Figure 1:
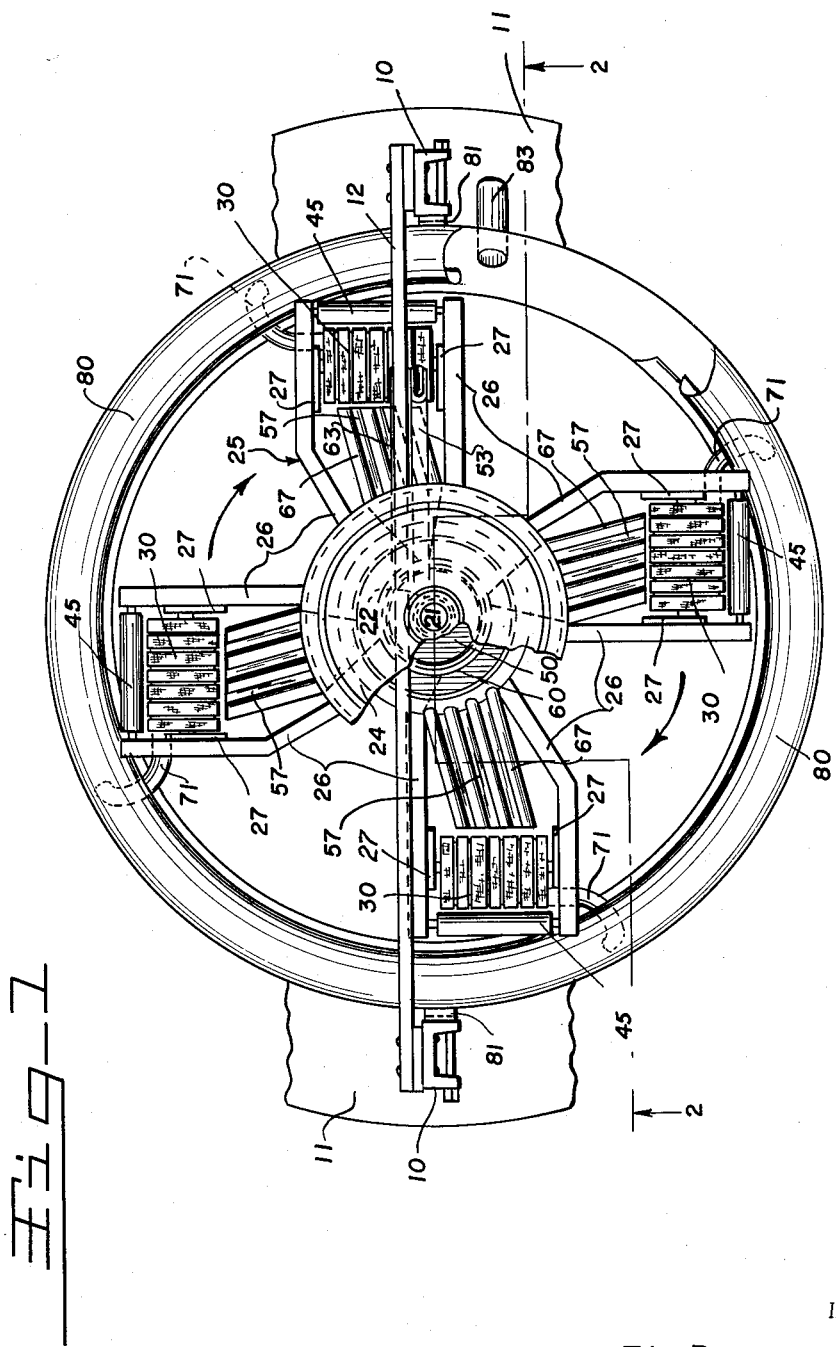
Figure 1 is a plan view of a centrifuge embodying the feature of this invention.

Referring now in greater detail to the drawings, a support or frame generally designated 10 is embedded in a concrete foundation 11 and is provided with a cross member 12.

Mounted within the confines of the frame 10 is a rotor assembly designated generally by the reference numeral 20. This assembly comprises a vertical shaft 21 journalled at its upper end in a bearing 22 mounted on cross member 12 of the support, and at its lower end journalled in a bearing 23 anchored in the aforementioned concrete foundation 11. The rotor shaft 21 is driven at high speed from any suitable power source through the medium of a suitable belt and pulley connection which includes a V-belt sheave 24 secured on the upper end of rotor shaft 21.

The rotor assembly further includes a spider or web structure indicated generally at 25 and fixed to the shaft 21. The spider 25 embodies a plurality of legs 26 extending radially from the shaft and grouped as shown.

Each group of legs 26 support a filter unit.

Each filter unit comprises opposed journal plates 27 suitably secured to the legs 26 of a group of such legs. The journal plates 27 of the filter unit support therebetween a pair of pulleys including an upper pulley 28 having an axle 31 journalled in the plates 27, and a lower pulley 29 having an axle 32 also journalled in the plates 27. Trained over the pulleys 28 and 29 are a plurality of endless filter belts 30 that are V-shape in cross section and are accommodated in V-shape grooves provided in the peripheries of the pulleys 28 and 29.

The journal plates are arranged in parallelism, that is, the units of each pair are parallel but the pairs are disposed with but one plate in a line radial to the axis of shaft 21. The filter belts of each filter unit are thus disposed between the journal plates and the inner faces of the inner runs face the axis of bodily rotation of the units. The journal plates which are in planes radial to the axis of bodily rotation are the leading edges or ends of the filter units and thus the filter units are disposed in planes which are tangential to the arc of bodily rotation. The purpose of this arrangement appears hereinafter.

For driving the filtering unit or belt assemblies just described, driven sprockets 33 are provided on the lower axles 32 and have trained thereover driving chains 36 that are also trained over sprockets 38 mounted on shafts 40 and provided with worm wheels 42. Shafts 40 are supported from the lowermost spider legs 26 by suitable brackets 39.

The worm wheels 42 are in mesh with a stationary worm 43 securely fixed on the concrete foundation 11 by anchoring means 44 and disposed in a position concentric with shaft 21.

From the foregoing it will be apparent that when the rotor or centrifuge assembly 20 is made to rotate, worm wheels 42 turn axially as they move around the stationary worm 43. Drive is transmitted from the worm wheels 42 through the chain and sprocket connections (38, 36 and 33) between shafts 40 and axles 32 to the lower pulleys 29. By reason of the frictional drive connection between pulleys 29 and 28 through the medium of the filter belts 30, the filter belts are made to travel about the pulleys as the entire rotor or centrifuge assembly rotates.

It will be understood that while I have shown a rotor or centrifuge assembly having four filtering units, any appropriate number of said units may be employed consistent with the requirement that the rotor assembly be dynamically balanced.

As previously herein stated, this invention contemplates the utilization of the coarse waste material as a filter for the slime, which coarse waste material and slime are the products of the process of ore leaching hereinbefore described, and to that end the centrifuge of this invention is provided with a pair of hoppers 50 and 60, arranged concentrically with respect to one another and to the shaft 21, the hopper 60 being provided for the reception of the filter or coarse waste material and the hopper 50 being provided for the reception of the slime or material to be filtered.

Hoppers 50 and 60 may be positively secured together in any suitable manner, or as an alternative may be formed integrally with one another, and the hopper 50 is secured positively to the shaft 21 in any suitable manner to rotate therewith, so that the hoppers rotate as a unit with the shaft.

The filter and the material to be filtered are directed to the hoppers 60 and 50 through the medium of ducts 63 and 53 that are supported from the cross member 12 through the medium of a suitable bracket structure 54. As shown, the discharge ends of the ducts 53 and 63 extend down into the hoppers a sufficient distance to prevent splashing.

For each filter belt assembly or filtering unit, hopper 60 has leading therefrom a plurality of discharge nozzles 67, and hopper 50, for each filtering unit or filter belt 30 assembly, has discharge nozzles 57 leading therefrom and disposed below the nozzle 67 (see Figure 2).

The discharge nozzles of each group extend from the hoppers 60 and 50 at a downward angle, that is, at an acute angle of the axis of the shaft 21. This arrangement lessens the radial component of the discharge force in depositing the material on the belts. And the latter, being tangentially arranged, as before described, the tangential component is substantially the only active element of the force depositing the material on the belts and it is caused to sweep across laterally the entire surface of the belt, thus making for far more effective distribution than is ordinarily the case, or would be the case were the belt surfaces so arranged that a radial line would bisect them breadthwise.

In addition to the foregoing, by having the filter belts at a slight angle to the axis of the rotation, the filtrate will drain from the surfaces of the belts through the unbounded cracks or spaces between the adjacent V-belts, more completely than otherwise would be the case.

It will also be noted that with the described arrangement of nozzles 67 and 57, the filter material and also the material to be filtered are discharged onto the belts intermediate the sides of the unit, and that also the filter material is continuously deposited on the surface of the belts in advance of the point where the material to be filtered is deposited on the belts.

It will also be understood that the total number of belts 30 in each filtering unit will be determined by the desired over-all width of each filtering unit, and that the number of nozzles in each group will be determined by the over-all width of the filtering unit, it being apparent that the greater number of nozzles employed in each group, the more even and uniform will be the deposit of the material discharging therefrom upon the belts of the filtering unit.

Each filtering unit has supported between the journal plates 27 thereof and immediately behind the load carrying surfaces or runs of the belts 30 a vertical series of peripherally grooved supporting rollers 46. The grooves of the rollers 46 are to a depth very nearly equal to the thickness of the belts 30. Also the grooves of the rollers 46 are so spaced that the individual belts 30 of the unit will be forced to laterally touch one another at the point of contact with these rollers. In this conection it will be understood that supporting rollers 46 will be employed only to the number required to maintain the mentioned desired proximity between the belts 30 of the unit.

Smooth surface rollers 45 are supported in the bifurcated ends of certain of the legs 26 of each group of such legs at the outsides of the belts 30 and serve to restrain the belts against excessive deflection caused by centrifugal force acting on the belts 30.

From the description of the invention thus far given, it is apparent that with the centrifuge in operation, the coarse waste material from the hopper 60 is deposited on the surfaces of the belts 30, coating those surfaces so as to provide for each filtering unit a filtering surface. As the surfaces of the filter belts are so coated, the slime or material to be filtered is, under the action of centrifugal force, which may be in the order of from 50 to 200 times that of gravity, discharged onto the filtering surfaces of the filtering units and in the process the solid particles or valuable minerals are retained on the filter belts 30 while the filtrate or liquid portion of the slime is forced through the unbonded cracks or interstices between the adjacent V-belts 30. For collecting the filtrate or liquid which has passed through the filtering surfaces of the filtering units, each unit includes a pan 70 that is interposed between the parallel runs of the belts 30 with an open side disposed immediately behind the runs of the belts facing the discharge nozzles 67 and 57 so that the filtrate passing through the filtering surfaces of the filtering units will be collected in said pan.

The pans 70 have extending laterally therefrom overflow or drain tubes 71 through which the filtrate or liquid within the pans is carried off and directed into a stationary receiving trough 80. Trough 80 is annular and is supported within the confines of the frame 10 through the medium of brackets 81. The trough 80, as shown to advantage in Figure 2, is circular in cross section and is open on its inner periphery to accommodate the ends of the drain tubes 71. The liquid in the receiving trough 80 may be drained therefrom and carried off to any suitable depository through the medium of a conduit 86 leading therefrom.

The concrete foundation 11 is formed with an annular pit 91 for receiving the solid particles or valuable mineral grains that adhere to the filtering surfaces of the filtering units and are carried downwardly by the belts 30. In this connection it will be understood that as the moving belts move downwardly and around the lower pulleys 29 the mentioned particles or grains, in response to the action of centrifugal force, are caused to fly off the belts, and the purpose of the pit 91 is to collect these particles.

For directing the freed particles into the pit 91 there is provided an annular baffle and chute 90. This baffle or chute 90 is supported in elevated position within the pit 91 and is secured in place in any suitable manner and as indicated generally at 92. It is apparent that the baffle chute 90, which is concavo-convex in cross section, is disposed in the path of the particles thrown off the belts 30 and hence will serve to deflect the particles into the collecting pit 91.

I have found in actual practice that a centrifuge having the features of construction and operation as above described serves admirably for utilizing the coarse waste material as a filter for the slime and that as a consequence the valuable mineral in the slime, which heretofore presented a considerable loss, is now recovered to a very material extent, if not completely.

In addition to the foregoing, the centrifuge of this invention has many advantages over known centrifuges used generally as a separator of solids from liquids. Among these advantages may be mentioned the mechanical strength of this centrifuge in relation to its weight. Another advantage is the ability of the centrifuge of this invention to withstand repeated flexion without wear; and a very important advantage resides in having the filtering units each composed of a plurality of individual belts. This is a material advantage in that should one belt of a filtering unit break, the resulting slight unbalancing of the centrifuge would require the centrifuge to be stopped, and complete destruction of the machine will not result prior to bringing the centrifuge to a complete stop. In addition, all parts of the centrifuge are readily accessible for inspection and repair.

While the invention has been described in detail in its presently preferred embodiment, it will, of course, be understood that such has been done for purposes of illustration only and not by way of limitation, and therefore only such limitations are to be imposed thereon as may reasonably come within the scope of the appended claims.

What I claim is:

1. A centrifuge for use in the process of leaching ores comprising a rotor revoluble on a vertical axis and embodying a plurality of filter units uniformly separated in a circular series therearound, each filter unit comprising a plurality of cross-sectionally triangular endless belts and guide pulleys therefor retaining the belts in substantial lateral edge contact, the guide pulleys being arranged to dispose the belts with their inner faces in vertical planes tangential to their arcs of bodily rotation with their leading edges nearest said axis, a hopper disposed on the rotor at the axis thereof and provided with downwardly inclined conductors directed towards the trailing edges and terminating at the inner faces of the filter belts to discharge the contents of the hopper thereon, the belts being laterally yieldable to permit the passage therebetween of the filtrate while retaining the filtered material on the outer surface, and a receiving trough below the rotor to receive the material retained on the belt surfaces.

2. A centrifuge for use in the process of leaching ores comprising a rotor revoluble on a vertical axis and embodying a plurality of filter units uniformly separated in a circular series therearound, each filter unit comprising a plurality of cross-sectionally triangular endless belts and guide pulleys therefor retaining the belts in substantial lateral edge contact, the guide pulleys being arranged to dispose the belts with their inner faces in vertical planes tangential to their arcs of bodily rotation with their leading edges nearest the axis of rotation, a pair of concentrically arranged hoppers mounted on the rotor in surrounding relation to the axis of the latter, downwardly and rearwardly directed conductors leading from the hoppers to the belts so as to discharge the hopper contents onto the belts, the hoppers being designed for the reception of coarse and fine waste material, pans disposed between the runs of the filter belts and having open sides facing the axis of bodily rotation, means for discharging the contents of the pans, and means for receiving the filtered material retained on the faces of the belts.

3. A centrifuge for use in the process of leaching ores comprising a rotor revoluble on a vertical axis and embodying a plurality of filter units uniformly separated in a circular series therearound, each filter unit comprising a plurality of cross-sectionally triangular endless belts and guide pulleys therefor retaining the belts in substantial lateral edge contact, the guide pulleys being arranged to dispose the belts with their inner faces in vertical planes tangential to their arcs of bodily rotation with their leading edges nearest the axis of rotation, a pair of concentrically arranged hoppers mounted on the rotor in surrounding relation to the axis of the latter, downwardly and rearwardly directed conductors leading from the hoppers to the belts so as to discharge the hopper contents onto the belts, the hoppers being designed for the reception of coarse and fine waste material, pans disposed between the runs of the filter belts and having open sides facing the axis of bodily rotation, means for discharging the contents of the pans, means for receiving the filtered material retained on the faces of the belts, and means for transmitting linear motion to the filter belts comprising a fixed worm concentric with the rotor axis, worm gears meshing with said worm and operative connections between the worm gears and the lower filter belt guide pulleys.

4. A centrifuge for use in the process of leaching ores comprising a rotor revoluble on a vertical axis and embodying a plurality of filter units uniformly separated in a circular series therearound, each filter unit comprising a plurality of cross-sectionally triangular endless belts and guide pulleys therefor retaining the belts in substantial lateral edge contact, the guide pulleys being arranged to dispose the belts with their inner faces in vertical planes tangential to their arcs of bodily rotation with their leading edges nearest the axis of rotation, a hopper carried by the rotor, downwardly and rearwardly directed conductors mounted on the rotor and extending to and terminating at the inner faces of the filter belts, pans disposed between the runs of the filter belts and having open sides facing the axis of bodily rotation, tubular conductors connected with the filter pans, an annular trough in surrounding relation to the rotor and formed with an inner slot through which the pan conductors extend, so as to provide a clearance space for the conductors in depositing the contents of the pans, and a receiving trough below the rotor to receive the material retained on the belt surfaces, the belt being relatively laterally yieldable to pass filtrate to the aforesaid pans.

References Cited in the file of this patent

UNITED STATES PATENTS

| | | |
|---|---|---|
| 96,304 | Brinjes | Nov. 2, 1869 |
| 636,762 | Conley | Nov. 14, 1899 |
| 1,309,651 | Mulet | July 15, 1919 |
| 1,950,869 | Stuart | Mar. 13, 1934 |
| 1,988,794 | Hill | Jan. 22, 1935 |
| 2,037,840 | Weston | Apr. 21, 1936 |
| 2,107,909 | Schaaf | Feb. 8, 1938 |
| 2,555,866 | Weaver et al. | June 5, 1951 |

FOREIGN PATENTS

| | | |
|---|---|---|
| 164,500 | Great Britain | June 10, 1921 |
| 616,615 | France | Feb. 5, 1927 |